US006710983B2

(12) United States Patent
Voldman

(10) Patent No.: US 6,710,983 B2
(45) Date of Patent: Mar. 23, 2004

(54) ESD PROTECTION FOR GMR SENSORS OF MAGNETIC HEADS USING SIGE INTEGRATED CIRCUIT DEVICES

(75) Inventor: Steven Howard Voldman, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 10/144,564

(22) Filed: May 10, 2002

(65) Prior Publication Data

US 2003/0210501 A1 Nov. 13, 2003

(51) Int. Cl.[7] ............................................. G11B 5/127
(52) U.S. Cl. ..................... 360/323; 324/249; 324/252; 324/207.21
(58) Field of Search ................... 360/323; 324/249, 324/252, 207.21; 338/32 R, 32 H; 365/157, 158

(56) References Cited

U.S. PATENT DOCUMENTS

| | | | |
|---|---|---|---|
| 5,559,051 A | 9/1996 | Voldman et al. | 437/51 |
| 5,587,857 A | 12/1996 | Voldman et al. | 360/103 |
| 5,614,727 A | 3/1997 | Mauri et al. | 257/43 |
| 5,644,454 A | 7/1997 | Arya et al. | 360/106 |
| 5,712,747 A | 1/1998 | Voldman et al. | 360/103 |
| 5,761,009 A | 6/1998 | Hughbanks et al. | 360/113 |
| 5,777,829 A | 7/1998 | Voldman et al. | 360/128 |
| 5,867,888 A | 2/1999 | Voldman et al. | 29/603.12 |
| 6,104,048 A | 8/2000 | Wang et al. | 257/272 |

OTHER PUBLICATIONS

Electronic Design—Jul. 10, 2000—Silicon–Germanium HBTs Merge with Mainstream CMOS Process by Ashok Bindra.

Primary Examiner—George J. Letscher
(74) Attorney, Agent, or Firm—Robert O. Guillot; IPLO Intellectual Property Law Offices

(57) ABSTRACT

A magnetic head includes a GMR read head that is protected from electrostatic discharge (ESD) on a slider by a silicon germanium (SiGe) integrated circuit device. In a preferred embodiment the SiGe circuit device includes one or more silicon germanium heterojunction bipolar transistors (SiGe HBT) or silicon germanium carbon heterojunction bipolar transistors (SiGeC HBT) that is electrically connected across the electrical leads of the GMR read head. Particular electrical connection configurations with the SiGe circuit devices include diodic modes, npn modes, series cascade modes and two stage ESD network configurations. The silicon chip may be sandwiched between the slider body and the read/write head or the read/write head may be sandwiched between the slider body and the silicon chip.

35 Claims, 5 Drawing Sheets

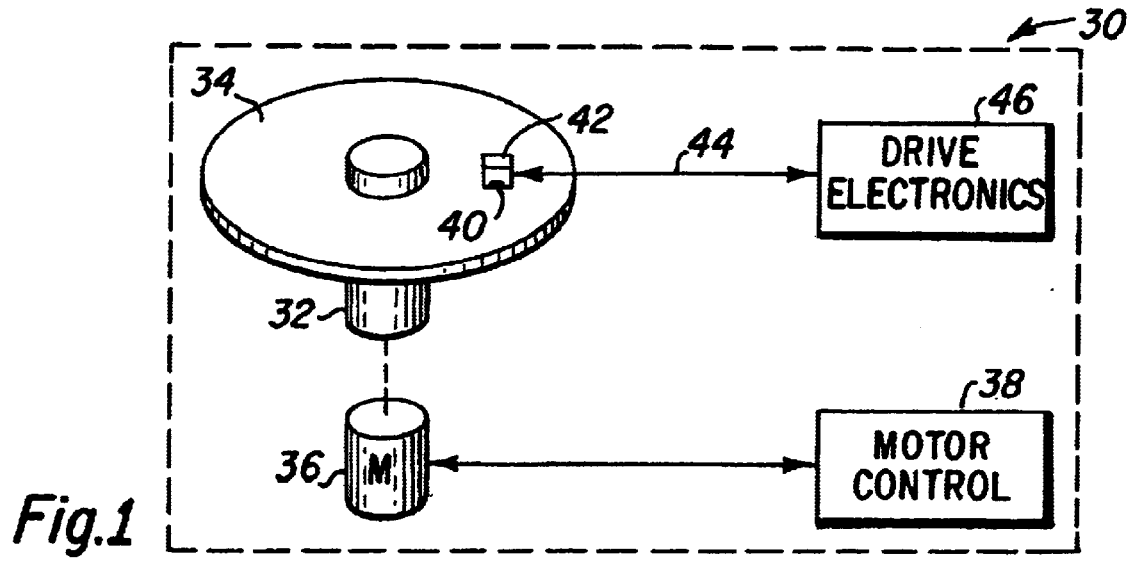
Fig.1
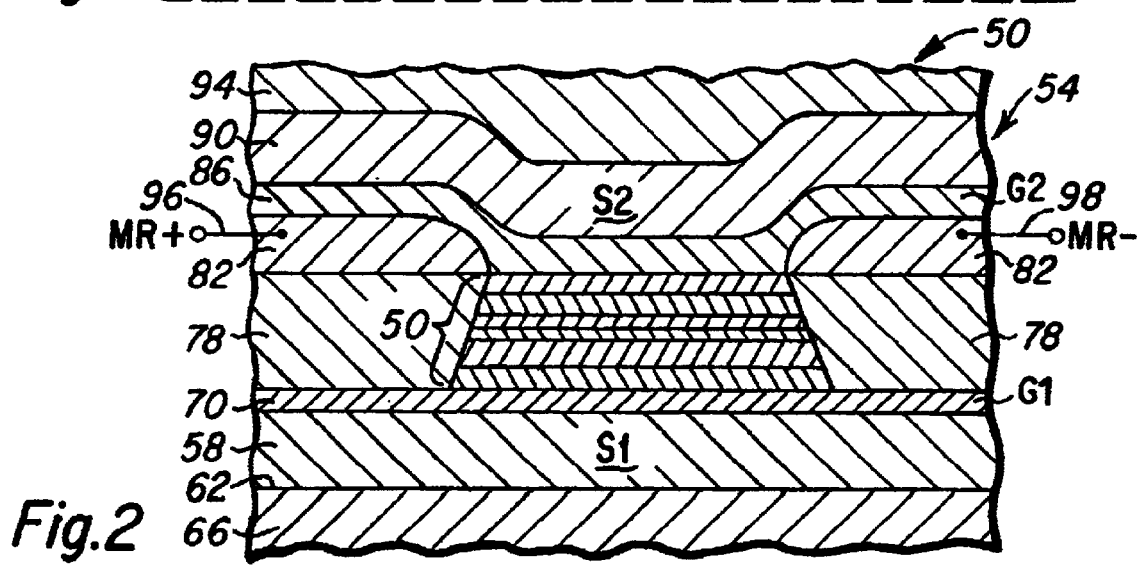
Fig.2 (PRIOR ART)
Fig.3

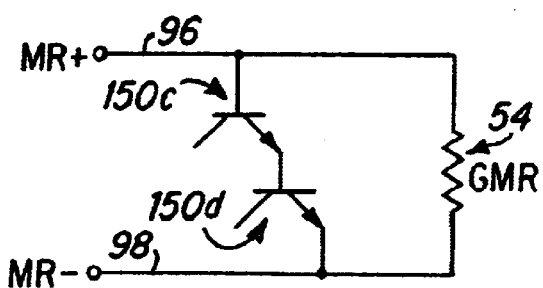
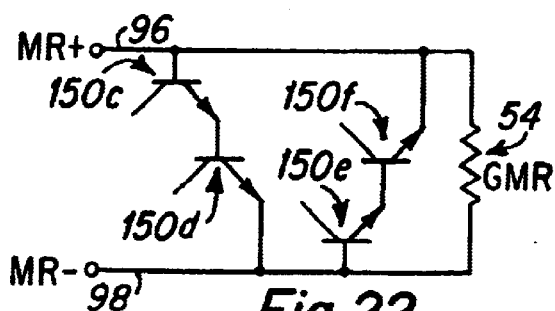
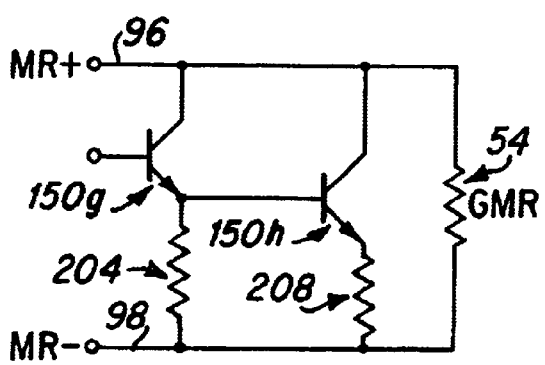
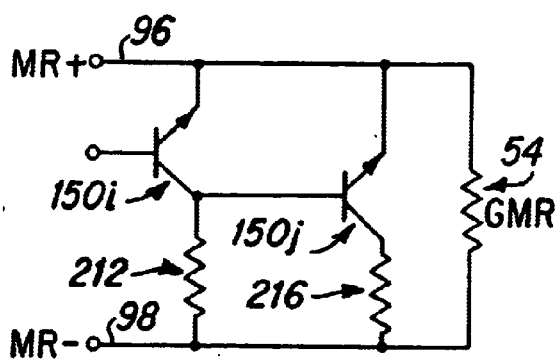
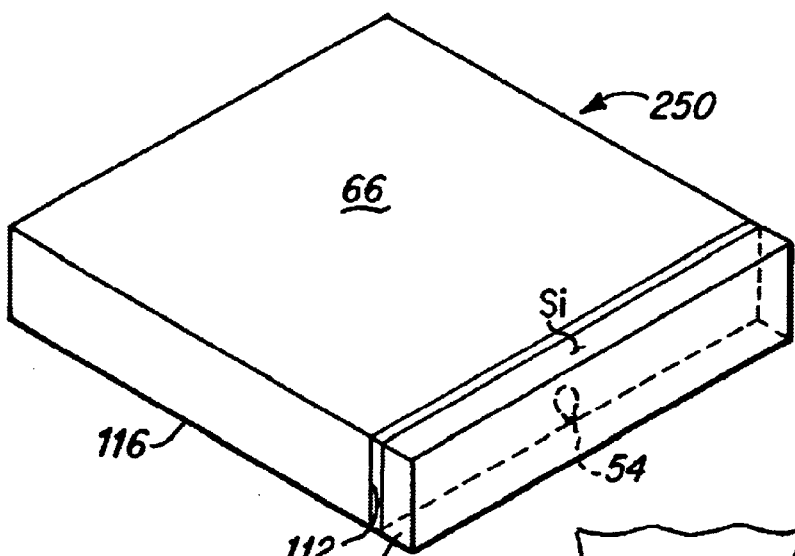
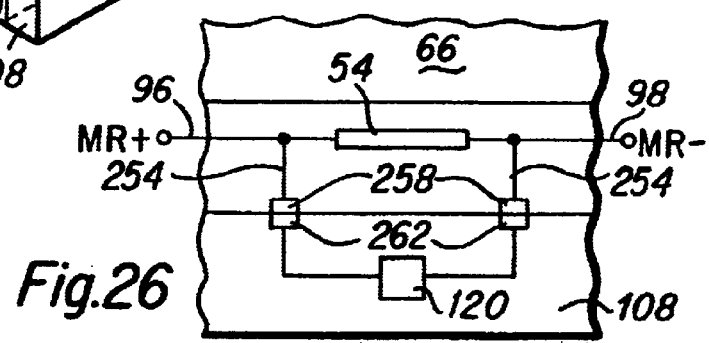

ESD PROTECTION FOR GMR SENSORS OF MAGNETIC HEADS USING SIGE INTEGRATED CIRCUIT DEVICES

BACKGROUND OF THE INVENTION

1. Field of the Invention

The present invention relates generally to ESD protection devices for the magnetoresistive (MR) read head sensor of a magnetic head, and more particularly to the use of silicon germanium (SiGe) and silicon germanium carbon (SiGeC) transistors as ESD protection devices that are placed across the electrical leads of a GMR sensor.

2. Description of the Prior Art

Magnetoresistive (MR) sensors are commonly used as read elements in thin film magnetic heads for sensing recorded signals on a magnetic medium, such as a magnetic disk. A thin film magnetic head which incorporates an MR sensor is called an MR head, and such MR heads are fabricated on devices termed sliders that are disposed within hard disk drives in close proximity to magnetic disks within the drive. When a magnetic medium, such as a magnetic disk is rotated adjacent the MR sensor, magnetic fields from the disk induce a response in the MR sensor causing the sensor to change its resistance. A sense current conducted through the MR sensor changes its magnitude proportionally to the change in resistance, and the magnitude changes are then processed by channel electronics into playback signals representing information stored on the magnetic medium.

A typical MR sensor is generally approximately 5 microns long, 1 micron high and 200 Angstroms thick. The length and thickness of the MR stripe are exposed at a surface of an MR head while the height is buried in the head body. During construction and assembly of the MR head, the MR sensor must be protected from electrostatic discharge (ESD), as a discharge of only a few volts can destroy or severely damage the MR sensor. Such a discharge can occur by contact with or close proximity to a person, during steps involved in the fabrication, or from components of a disk drive. The prior art teaches the use of electrical elements to protect MR sensors from ESD. These elements include diodes which shunt excessive current away from the MR sensor to larger conductive components in the head via leads which are connected to the MR sensor. Such larger components may include shield or coil layers that form part of an integrated MR head.

A prior art improvement in ESD protection of MR sensor includes the fabrication of magnetic heads on sliders using thin film technology, combined with the construction of ESD protection elements on a silicon wafer by integrated circuit technology. Such prior art ESD protection devices are described in U.S. Pat. No. 5,587,857, the disclosure of which is incorporated herein as though set forth in full. Significantly, as disk drive technology has advanced, magnetic head components have decreased in size in order to increase the data areal storage density of the disk drive, and as a result, advanced MR sensors, termed giant magnetoresistive (GMR) sensors, have been developed. Such GMR sensors have smaller components and lower ESD thresholds than prior art MR sensors, such that an ESD event of less than even one volt can cause permanent damage to the GMR sensor component. The prior art ESD protection devices, such as silicon diodes described in the above-mentioned '857 patent, have ESD protection thresholds of approximately 1.4 volts, such that these prior art ESD protection devices are not capable of fully preventing ESD damage to the advanced GMR sensor components. A need therefore exists for the development and implementation of ESD protection devices having lower ESD voltage thresholds in order to protect sensitive GMR sensor components. The present invention utilizes silicon germanium (SiGe) and silicon germanium carbon (SiGeC) integrated circuit devices for ESD protection, in that such devices have sufficiently low threshold voltages to provide needed ESD protection for GMR sensors.

SUMMARY OF THE INVENTION

The present invention includes a GMR head on a slider which is protected from ESD damage by SiGe and/or SiGeC integrated circuit elements, preferably by Heterojunction Bipolar Transistors (SiGe HBT and/or SiGeC HBT) that are generally referred to herein as silicon germanium circuit devices. In a preferred embodiment a silicon chip, containing the SiGe circuit device is located on the trailing edge of the slider. A thin film GMR head is located on the trailing edge of the silicon chip so that when the GMR head is constructed, interconnects can easily be made with the integrated circuit elements. In an alternative embodiment the GMR head is constructed on the trailing edge of the slider and the silicon chip with its ESD protection device is mounted adjacent the GMR head making electrical connections through pre-formed pads. The SiGe circuit device may be electrically connected in different configurations, including a diodic configuration, an npn mode, a series cascade configuration and a two stage ESD network configuration.

A series of steps are provided for mass producing the GMR head on a slider with ESD protection. Integrated circuit technology is employed to construct the SiGe circuit device for multiple GMR heads on a silicon wafer. In a preferred embodiment this silicon wafer is fixedly attached to a wafer of slider material to provide a composite wafer. Using thin film technology a series of GMR heads are constructed on top of the silicon wafer with electrical connections being made to the SiGe circuit devices. The composite wafer is then diced into quadrants, each quadrant containing rows and columns of sliders. Each quadrant is then diced into rows, each row containing a row of sliders. Each row is then lapped which forms an air bearing surface (ABS) for each slider. Each row is then diced into individual sliders which is the completed product.

An object of the present invention is to provide an MR head which is connected to an SiGe integrated circuit device on a slider.

Another object is to provide a GMR head which is protected from ESD by SiGe HBT and/or SiGeC HBT devices on a slider.

A further object of the present invention is to provide a GMR head which is protected from ESD by SiGe HBT and/or SiGeC HBT transistor devices that are placed across the electrical leads of the GMR head.

Yet another object is to provide a method of merging thin film and integrated circuit technologies for mass producing GMR heads on sliders which are protected from ESD by SiGe HBT and/or SiGeC HBT integrated circuit devices.

Other objects, advantages and features of the invention will be readily apparent after reviewing the following specification, claims and accompanying drawings.

IN THE DRAWINGS

FIG. 1 is a schematic illustration of a disk drive;

FIG. 2 is a cross-sectional view of a prior art GMR head;

FIG. 3 is a schematic isometric illustration of the first embodiment of the invention which includes a GMR head mounted on a silicon chip which, in turn, is mounted on the trailing edge of a slider;

FIG. 5A is a schematic isometric illustration of the step of constructing a plurality of SiGe circuit devices on a silicon wafer;

FIG. 5B is a schematic isometric illustration of the step of fixedly mounting the silicon wafer to a TiC wafer for constructing a plurality of sliders;

FIG. 5C is a schematic isometric illustration of constructing rows and columns of GMR heads on the silicon wafer;

FIGS. 11–24 illustrate particular ESD protection circuits of the present invention;

FIG. 25 is a schematic isometric illustration of a second general embodiment of the present invention which includes a GMR head mounted on the trailing edge of the slider between the slider and the silicon chip;

FIG. 26 is a planar schematic illustration of the connection of an SiGe circuit device to a GMR sensor of an MR head;

FIG. 27 is a schematic isometric illustration of the step of constructing a plurality of SiGe circuit devices on a silicon wafer;

FIG. 28 is a schematic isometric illustration of the step of constructing rows and columns of GMR heads on a TiC wafer which is used to make sliders;

FIG. 29 is a schematic isometric illustration of the step of fixedly mounting the silicon wafer to the TiC wafer to form a composite wafer;

FIG. 30 is a schematic illustration of the step of dicing the composite wafer into quadrants of rows and columns of sliders;

FIG. 31 is a schematic isometric illustration of a row of sliders after a step of dicing one of the quadrants into a plurality of rows and columns of sliders; and FIG. 32 is a schematic isometric illustration of a single slider after a step of dicing the row shown in FIG. 31 into a plurality of sliders.

DETAILED DESCRIPTION OF THE PREFERRED EMBODIMENTS

Figure 4:
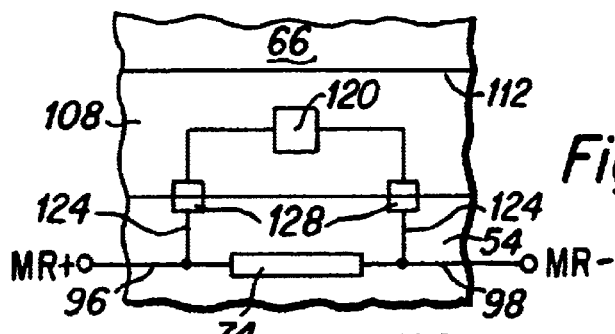
FIG. 4 is a schematic planar illustration of circuit connections of a GMR sensor to an SiGe circuit device.

Referring now to the drawings wherein like reference numerals designate like or similar parts throughout the several views, a magnetic hard disk drive 30 is illustrated in FIG. 1. The drive 30 includes a spindle 32 which supports and rotates a disk 34, and the spindle 32 is rotated by a motor 36 which is controlled by motor controls 38. A magnetic read/write transducer, referred to as a magnetic head 40, is mounted on a slider 42 which, in turn, is supported by a suspension and actuator arm 44. The magnetic head 40 includes a giant magnetoresistive (GMR) head according to the invention. The suspension and actuator arm 44 positions the slider 42 so that the magnetic head 40 is in a transducing relationship with a surface of the disk 34, such that when the disk 34 is rotated by the motor 36, air moved by the top of the disk together with the structure of the slider 42 causes the slider to ride on a cushion of air, referred to as an air bearing. The thickness of the air bearing, also referred to as the "flying height" of the slider, is typically less than 5.0 microinches. The magnetic head 40 is then employed for writing and reading information in multiple circular tracks on the surface of the disk 34. These information signals as well as servo signals for moving the slider to various tracks are processed by drive electronics 46 which are connected to the magnetic head 40.

A typical prior art magnetic head 50 is fabricated to include a GMR read head portion 54 for reading data from a hard disk 34 and a write head portion for writing to a hard disk, and FIG. 2 is a generalized depiction of a prior art GMR read head portion 54 of a magnetic head 50 which will serve as a starting point for the description of the present invention that follows. As depicted in FIG. 2, the GMR head 54 includes a first magnetic shield layer (S1) 58 that is fabricated upon the surface 62 of a substrate base 66. A first insulation layer (G1) 70 is fabricated upon the S1 shield 58 and a plurality of read head GMR sensor layers 74 are then fabricated upon the G1 layer 70. Using photolithographic and etching techniques, portions of the sensor layers are removed such that the central portions 74 depicted in FIG. 2 remain. Thereafter, hard bias elements 78 are fabricated next to the sensor layers 74, electrical leads 82 are fabricated upon the hard bias elements 78, a second electrical insulation layer (G2) 86 is deposited across the device followed by the fabrication of a second magnetic shield (S2) 90, and a write head portion (generally indicated as 94) is subsequently fabricated to complete the magnetic head fabrication process. Extended electrical leads 96 and 98, designated as MR+ and MR−, respectively, are fabricated in connection with the electrical leads 82 within the head for electrical connection to the drive electronics 46. A disk reading function is performed by the head 54 when magnetic fields on a rotating disk 34 cause a change of resistance of the GMR sensor 74; the resistance change causes a voltage change across the leads 82 connected to the GMR sensor, and the voltage variations are processed into information signals by the drive electronics 46.

It is important that the GMR sensor 74 be protected from electrostatic discharge (ESD) during its construction and during assembly of the disk drive shown in FIG. 1, as well as during the disk drive operations to prevent destruction or distortion of the GMR head 54. The functional range of the GMR head is approximately 0–400 mV, and the point of destruction of the GMR head is when an approximately 1 Volt potential exists across the electrical leads 82. The impedance of the GMR head is typically 5–100 Ohms.

In the present invention for prevention of overvoltage of the GMR head 54, an ESD protection device is placed across the two electrical leads 96 and 98 of a magnetic head. As is discussed in greater detail herebelow, one or more silicon germanium circuit devices, preferably a silicon germanium Heterojunction Bipolar Transistor (SiGe HBT) or silicon germanium carbon Heterojunction Bipolar Transistor (SiGeC HBT), is advantageously utilized due to its superior performance at the low voltages necessary to protect the GMR head 54.

FIG. 3 is a generalized illustration of a first magnetic head embodiment 100 of the present invention with a GMR head 54 shown schematically mounted on the trailing edge 104 of a SiGe chip 108 which, in turn, is mounted on the trailing edge 112 of a slider substrate 66. The air bearing surface (ABS) 116 of the slider 66 is formed by the bottom surface of the GMR head 54, the SiGe chip 108 and the slider 66. The silicon chip 108 is preferably fixedly mounted to the trailing edge 112 of the slider 66 by bonding with epoxy or by C-4 solder. The GMR head 54 and the silicon chip 108 thus form a small portion of an air bearing surface (ABS) 116 with the major portion of the air bearing surface being provided by the slider 66. While FIG. 3 depicts a single GMR head carried by the slider, it should be understood that the slider may carry a plurality of GMR heads according to the teachings of the present invention.

FIG. 4 depicts an ESD protective SiGe circuit device 120 interconnecting the MR+ and MR− electrical leads 96 and 98 of the GMR sensor 74 through GMR head vias 124 that lead to interconnecting pads 128. The silicon chip including the SiGe circuit device is mounted to the slider rear surface 112, and the GMR head 54 is fabricated upon the silicon chip 108. A detailed description of the fabrication of this device is next presented with aid of FIGS. 5–9.

Figure 5A:
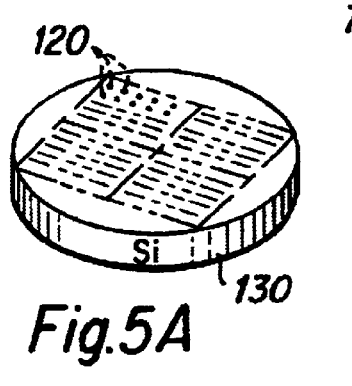
FIGS. 5A–5C are schematic illustrations of a method of mass producing the first embodiment of the invention shown in FIGS. 3–4.
Figure 5B:
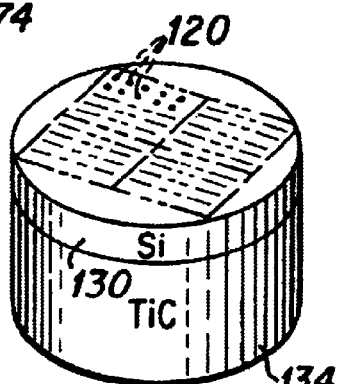

A method of constructing the first magnetic head embodiment 100 illustrated in FIGS. 3 and 4 is illustrated in a series of steps shown in FIGS. 5A through 9. In FIG. 5A the first step is to construct a plurality of protective elements 120 using known techniques for SiGe integrated circuit fabrication on one face of a silicon wafer 130. Such elements may include SiGe HBT and/or SiGeC HBT transistor devices that are described hereinbelow. The next step (see FIG. 5B) is to fixedly mount the silicon wafer 130 on a wafer 134 of slider material, such as TiC. The next step (see FIG. 5C) is to construct rows and columns of MR heads 54 on top of the silicon wafer 130 and on top of the protective SiGe circuit devices 120 as described hereinabove with reference to FIGS. 3 and 4. This provides a composite TiC/Si composite wafer of FIG. 5C in which the SiGe ESD protection devices 120 are electrically interconnected across the GMR electrical leads 96 and 98.

Figure 5C:
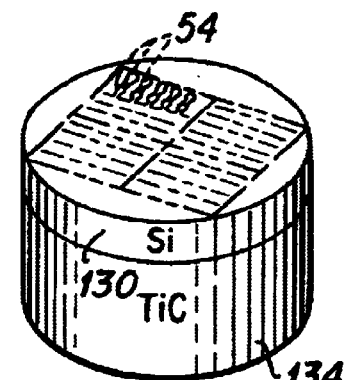
Figure 6A:
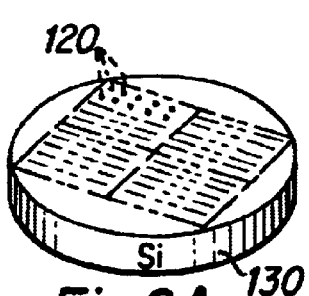
FIG. 6A is an illustration which is the same as FIG. 5A.
Figure 6B:
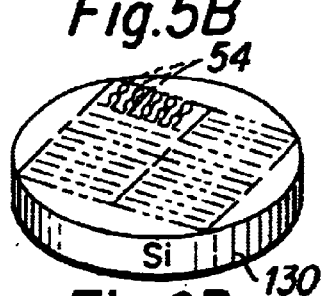
FIG. 6B is a schematic isometric illustration constructing a plurality of rows and columns of GMR head on the silicon wafer before fixedly mounting the silicon wafer to the TiC wafer.
Figure 6C:
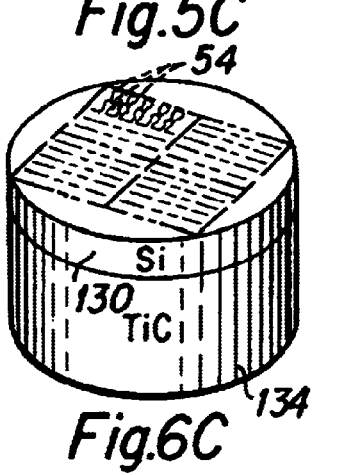
FIG. 6C is a schematic isometric illustration of the step of fixedly mounting the silicon wafer to the TiC wafer to form a composite wafer after constructing the GMR heads on the silicon wafer.

Modified steps in the construction are illustrated in FIGS. 6A through 6C for achieving the composite wafer shown in FIG. 5C. The step shown in FIG. 6A is the same as the step implemented in FIG. 5A, namely, constructing the protective SiGe circuit device 120 on the silicon chip 108. FIG. 6B is different in that the magnetic heads 54 are fabricated on the silicon chip 108 prior to fixedly mounting the silicon chip 108 on the TiC wafer 134. In FIG. 6C the silicon wafer 130 of FIG. 6B is fixedly mounted to the TiC wafer 134 providing the same result as shown in FIG. 5C.

Figure 7:
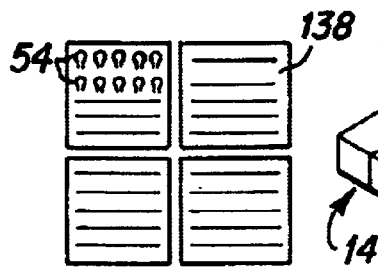
FIG. 7 is a schematic illustration of the step of dicing the composite wafer into quadrants, each quadrant containing rows and columns of sliders.
Figure 8:
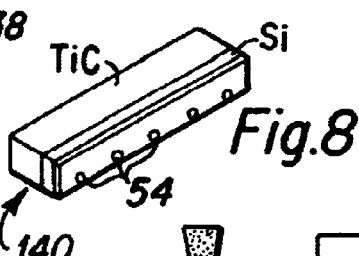
FIG. 8 is a schematic isometric illustration of one of the rows of GMR heads after dicing one of the quadrants of FIG. 7 into a plurality of rows of sliders.
Figure 9:
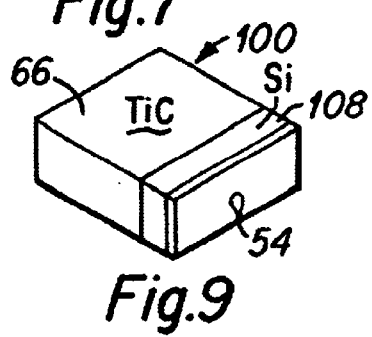
FIG. 9 is a schematic isometric illustration of a single slider after dicing the row in FIG. 8 into individual sliders.

FIG. 7 illustrates a step of dicing the composite wafer of FIG. 5C or FIG. 6C into quadrants 138, each quadrant containing rows 140 and columns of magnetic heads 54. FIG. 8 illustrates one row 140 of sliders after one of the quadrants 138 in FIG. 7 is diced into a plurality of rows 140 of sliders. FIG. 9 illustrates a composite single slider 66, silicon chip 108, and magnetic head 54 after dicing the row of sliders 140 in FIG. 8 into a plurality of magnetic heads 100 of the present invention.

Figure 10:
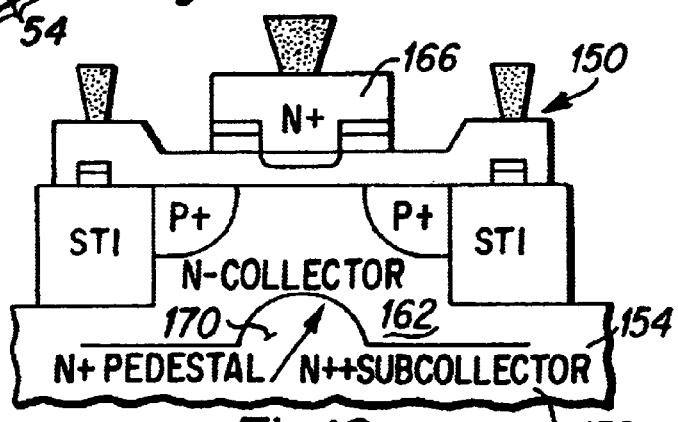
FIG. 10 is a schematic diagram of an SiGe Heterojunction Bipolar Transistor (SiGe HBT) integrated circuit element and an SiGeC HBT circuit element that can be used to provide ESD protection in preferred embodiments of the present invention.

In FIG. 10, an exemplary SiGe HBT integral circuit structure 150 is shown. Such devices are known to those skilled in the art, and a detailed description is not necessary for a full understanding of the present invention. Briefly, the SiGe HBT devices 150 are designed on a p-substrate 154. A n++ subcollector 158 is formed in the p-substrate and shallow trench isolation and deep trench isolation are formed, followed by epitaxial base SiGe film growth 162. A first n+ pedestal implant 166 is then done to allow the collector implants move closer to the silicon surface. The SiGe epitaxial film 162 is grown on the silicon surface forming the extrinsic base over the shallow trench isolation and the intrinsic base region over the single crystal silicon region. A second n+ pedestal region 170 is then implanted through the emitter window of only one SiGe HBT. The pedestal implant 170 is typically formed to reduce the Kirk effect which results from a high current density which forces the space charge region of the base-collector junction to get pushed into the collector region. This reduces the frequency response of the transistor. To prevent this, the extra pedestal implant 170 is placed so to maintain a high $f_T$ device— which in turn causes a low $BV_{CEO}$ breakdown voltage.

For effective use in the present invention, the transistor structure should have a low capacitance to avoid loading effects, and an SiGe HBT transistor 150 allows for low emitter-base capacitance at the emitter base junction. Particularly, the capacitance of a 30 um wide SiGe HBT npn transistor has a 0.04 pF load capacitance on the input node. This is because of the graded germanium profile allows for low emitter base capacitance and achieves high current gain as well as a high output conductance. The silicon germanium transistor also has a low collector resistance which is important for ESD protection.

FIG. 10 also comprises a depiction of a SiGeC HBT transistor device, in that the difference between an SiGe transistor and an SiGeC transistor is that in the SiGeC transistor, carbon is placed in the base region to control the boron outdiffusion; hence carbon is substitutional or interstitial in the SiGe film. Other features of the transistors are substantially the same. Diagrams depicting the use of a plurality of SiGe and/or SiGeC transistors as ESD protection devices are next provided with reference to FIGS. 11 through 24.

Figure 11:
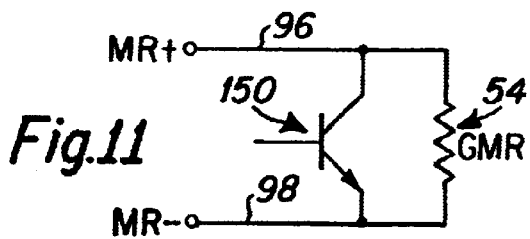

FIG. 11 depicts an ESD protection device using an SiGe or SiGeC transistor 150 in which the collector is engaged to the MR+ lead 96 and the emitter is engaged to the MR− lead 98 of the GMR sensor 54. In this configuration, when a positive pulse is applied to the MR+ electrode, when the BVCEO of the transistor is exceeded, current will flow through the transistor instead of the MR head. The BVCEO assumes the base is floating. It is well known that the breakdown voltage can be modified to a higher voltage as a result of adding resistance in series with the base electrode. For a negative applied pulse, discharge will occur from the collector to the substrate of transistor. The advantage of this configuration is the ability to protect from both positive and negative pulses. Additionally, SiGe and SiGeC transistors are ESD robust in a collector-to-emitter configuration.

Figure 12:
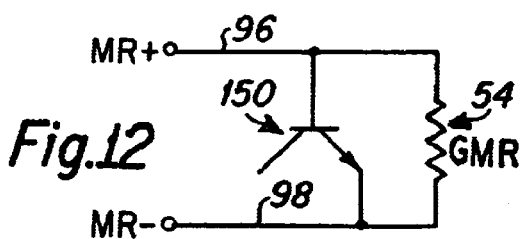

FIG. 12 depicts an ESD protection device using an SiGe or SiGeC transistor that is configured with the base connected to the MR+ and the emitter electrode connected to MR−. The advantage of this configuration is that the base-emitter capacitance has a low value compared to the collector-base region. The ESD robustness is a function of the spacing of the emitter implant and the extrinsic base implant. The robustness as well as the capacitance can be optimized for ESD and loading effects for the GMR device.

Figure 13:
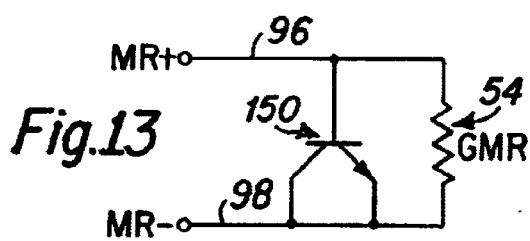

FIG. 13 depicts an ESD protection device using an SiGe or SiGeC transistor that is configured with the base connected to the MR+ and the emitter and collector electrode connected to MR−. The advantage of this configuration is that the base-emitter and base-collector are used in parallel for improved ESD robustness.

Figure 14:
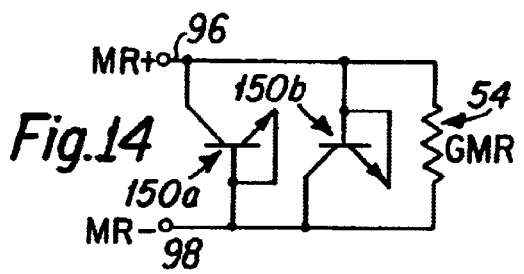

FIG. 14 depicts an ESD protection device using two SiGe or SiGeC transistors 150a and 150b that are connected in diodic modes. In this device a first transistor 150a is connected such that the collector is engaged to the MR+ lead 96, the base is connected to the MR− lead 98, and the emitter is connected to the base. The second transistor 150b is connected oppositely to the first device 150a, such that the collector is connected to the MR− lead 98, the base is connected to the MR+ lead 96, and the emitter is connected to the base. The advantage of this configuration is that the base-collector junctions are ESD robust in both a forward and reverse region. The implementation also isolates the emitter-base junction which can be vulnerable to hot electron overstress and ESD failure. The disadvantage is the loading capacitance of the base-collector junction forces the structure to be small for high performance. A second advantage is the implementation also has a collector-to-substrate for discharge of negative ESD events.

Figure 15:
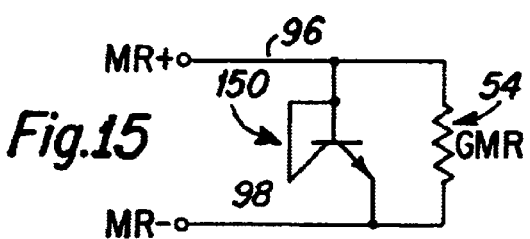

FIG. 15 depicts an ESD protection device using an SiGe or SiGeC transistor 150 that is connected in a diodic mode with a base connected to the MR+ and the emitter electrode connected to MR−. The advantage of this configuration is that the base-emitter capacitance has a low value compared to the collector-base region. The ESD robustness is a function of the spacing of the emitter implant and the extrinsic base implant. The robustness as well as the capacitance can be optimized for ESD and loading effects for the GMR device. In this case, the collector is tied to MR+ allowing utilization of the collector-to-substrate junction for negative pulses. The subcollector-to-ground junction can be a low capacitance junction by providing deep trench isolation on the perimeter of the collector region. This will provide a low capacitance ESD protection.

Figure 16:
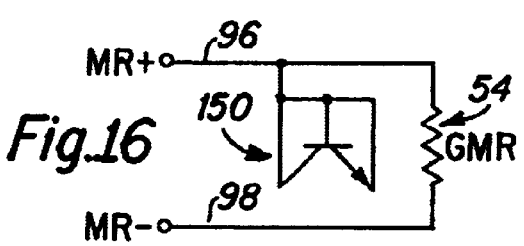

FIG. 16 depicts an ESD protection device using an SiGe or SiGeC transistor 150 in which the emitter, base and collector are shorted to the MR+ lead. In this configuration, a SiGe or SiGeC transistor is configured with the collector-to-ground can provide ESD protection for a positive and negative pulse. The advantage of this configuration is that the collector-to-substrate capacitance has a low value compared to the collector-base region. In this case, the collector is tied to MR+ allowing utilization of the collector-to-substrate junction for negative pulses. The positive pulse is also addressed using this junction in a breakdown mode. The subcollector-to-ground junction can be a low capacitance junction by providing deep trench (DT) isolation on the perimeter of the collector region. A trench isolation (TI) region can also be formed by implementing an isolation region which intersects the collector edge. This will provide a low capacitance ESD protection. Even without the trench isolation, a low capacitance ESD to protection can be provided.

Figure 17:
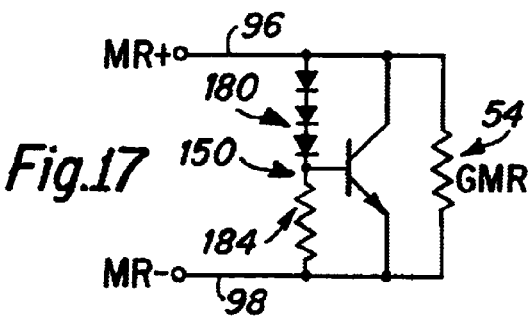

FIG. 17 depicts an ESD protection device using an SiGe or SiGeC transistor 150 that is configured in an npn mode, wherein the base is engaged with a level shifting network. Specifically, the collector is engaged to the MR+ lead 96, the emitter is engaged to the MR− lead 98, the base is engaged to the MR+ lead 96 through one or more diodes 180, and the base is also connected to the MR− lead 98 through a resistive element 184. In this configuration, the trigger of the SiGe or SiGeC transistor is initiated by the circuit 150. The trigger condition is determined by the number of the diodic elements placed in series with the base region. These diodic elements can be Si p-n diodes, Schottky diodes, Mott diodes, SiGe varactors, SiGeC varactors, or elements with more than two electrodes (e.g. Si npn transistors, SiGe transistors, SiGeC transistors, MOSFET transistors, and SCR elements) where they are used in a diode configuration. As the voltage on MR+ exceeds the turn-on voltage of the series diodes, the base current flows through the base of the transistor, initiating the circuit. The advantage of this circuit is that the trigger condition can be established by the number of elements and that it does not have to be dependent on the transistor breakdown voltages (e.g. BVCEO, BVCER, BVEBO, and BVCBO). The significant advantage is the low trigger voltage as well as using the trigger to supply base current to initiate the circuit.

Figure 18:
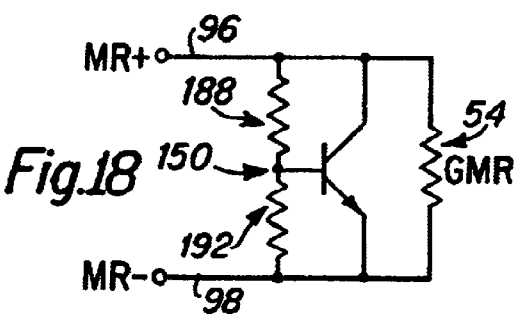

FIG. 18 depicts an ESD protection device using an SiGe or SiGeC transistor 150 that is configured in an npn mode with a reference network. That is, the collector is engaged to the MR+ lead 96, the emitter is engaged to the MR− lead 98, the base is connected to the MR+ lead 96 through a first resistive element 188, and the base is also connected to the MR− lead 98 through a second resistive element 192. In this configuration, the trigger of the SiGe or SiGeC transistor is initiated by the circuit 150. The trigger condition is determined by the resistor No elements placed in series with the base region. This network acts as a resistor divider network whose turn-on is adjusted by the resistor values. An advantage of this circuit is that the reference voltage can be specifically tuned to the circuit application. A second advantage is that the circuit operates in the forward transistor or reverse transistor mode of operation. Hence a symmetric or an asymmetric network is established using the collector-to-emitter current flow or the emitter-to-collector current flow.

Figure 19:
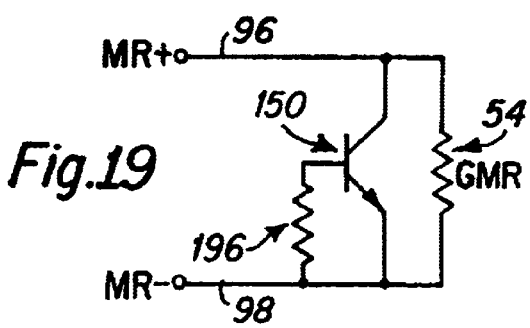

FIG. 19 depicts an ESD protection device using an SiGe or SiGeC transistor 150 that is configured in an npn mode with a grounded base. That is, the collector is engaged to the MR+ lead 96, the emitter is engaged to the MR− lead 98, and the base is engaged to the MR− lead 98 through a resistive element 196. In this configuration, the trigger of the SiGe or SiGeC transistor is initiated by the BVCER breakdown condition. The BVCER breakdown voltage is higher than the BVCEO (open base) breakdown value. Hence in one mode of operation, with a positive pulse to the electrode MR+ the circuit initiation occurs above the BVCEO of the transistor. An advantage of this is that if the BVCEO was much lower than the MR functional level, the BVCER value would delay turn on of the ESD network outside of the functional regime. With a positive pulse to the MR− electrode, the resistor 196 serves as base drive and initiation of the reverse transistor (emitter to collector current flow). The advantage of this implementation is usage of a single element for lower capacitance loading and the delay of the higher breakdown condition.

Figure 20:
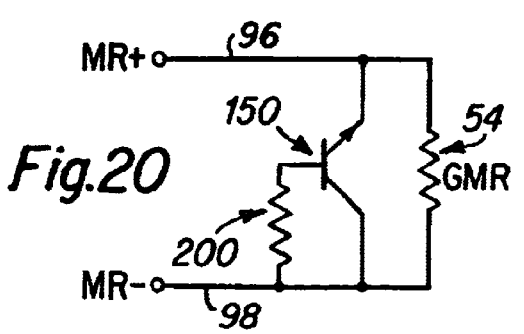

FIG. 20 depicts an ESD protection device using an SiGe or SiGeC transistor 150 that is configured in an npn common collector mode with a grounded base. That is, the emitter is connected to the MR+ lead 96, the collector is connected to the MR− lead 98 and the base is connected to the MR− lead 98 through a resistive element 200. In this configuration, the to) transistor is flipped with respect to the prior implementation. The trigger of the SiGe or SiGeC transistor is initiated by the BVECR breakdown condition. The BVECR breakdown voltage is higher than the BVCEO (open base) breakdown value. Hence in one mode of operation, with a positive pulse to the electrode MR+ the circuit initiation occurs above the BVECO of the transistor. An advantage of this is that if the BVECO was much lower than the MR functional level, the BVECR value would delay turn on of the ESD network outside of the functional regime. With a positive pulse to the MR− electrode, the resistor 200 serves as base drive and initiation of the forward transistor (collector to emitter current flow). The advantage of this implementation is usage of a single element for lower capacitance loading and the delay of the higher breakdown condition as well as a low capacitance emitter -base junction compared to the base-collector junction (on the MR+ electrode).

FIG. 21 depicts an ESD protection device in which a pair of SiGe or SiGeC transistors 150c and 150d are configured in a series cascade engagement, such that a plurality of elements are in series where the last element is connected to MR−. That is, the base of a first transistor 150c is engaged to the MR+ lead 96, the emitter of the first transistor 150c is engaged to the base of a second transistor 150d, and the collector of the first transistor device 150c is floating; the emitter of the second transistor 150d is engaged to the MR− lead 98, and the collector of the second transistor 150d is floating. The advantage of this configuration is that the base-emitter capacitance has a low value compared to the collector-base region. The ESD robustness is a function of the spacing of the emitter implant and the extrinsic base implant. The robustness as well as the capacitance can be optimized for ESD and loading effects for the GMR device. In this case, the collector is tied to substrate for negative ESD events. The subcollector-to-ground junction can be a low capacitance junction by providing deep trench isolation on the perimeter of the collector region. This will provide a low capacitance ESD protection. The advantage of the series configured elements is the higher turn-on voltage of the ESD network. Additionally, the series capacitance elements are lower between the MR+ to MR− electrodes since capacitors in series provide a lower net capacitance.

FIG. 22 depicts an ESD protection device in which four SiGe or SiGeC transistors 150c, 150d, 150e and 150f are arranged in a bidirectional series cascade configuration. That is, a first pair of transistors 150c and 150d are arranged in a series cascade configuration as described above with regard to FIG. 22, and a second pair of transistors 150e and 150f are arranged in a reversed series cascade configuration, wherein the base of a transistor 150e is engaged to the MR− lead 98, the emitter of the transistor 150e is engaged to the base of a second transistor 150f, and the emitter of the second transistor 150f is engaged to the MR+ lead 96; the collectors of the second pair of transistors 150e and 150f are floating. Basically, in this configuration, an SiGe or SiGeC transistor is configured with the base connected to the MR+ and the emitter electrode connected to a second SiGe or SiGeC transistor in a series configuration. A plurality of elements are in series where the last element is connected to MR−. The advantage of this configuration is that the base-emitter capacitance has a low value compared to the collector-base region. The ESD robustness is a function of the spacing of the emitter implant and the extrinsic base implant. The robustness as well as the capacitance can be optimized for ESD and loading effects for the GMR device. In this case, the collector is tied to substrate for negative ESD events. The subcollector-to-ground junction can be a low capacitance junction by providing deep trench isolation on the perimeter of the collector region. This will provide a low capacitance ESD protection. The advantage of the series configured elements is the higher turn-on voltage of the ESD network. Additionally, the series capacitance elements are lower between the MR+ to MR− electrodes since capacitors in series provide a lower net capacitance. A second advantage exists by having the bidirectionality so that equal ESD robustness exists for the MR+ and the MR− electrodes. The disadvantage is the additional space and added capacitance.

FIG. 23 depicts an ESD protection device in which two SiGe or SiGeC transistors 150g and 150h are engaged in a two stage ESD network configuration. That is, the collector of a first transistor 150g is engaged to the MR+ lead 96, the base of the first transistor 150g can be floating, connected to its emitter or to additional circuitry, the emitter of the first transistor 150g is connected to the base of a second transistor 150h, and the emitter is also connected through a resistive element 204 to the MR− lead 98. The collector of the second transistor 150h connected to the MR+ lead 96, and the emitter of the second transistor 150h is engaged through a resistive element 208 to the MR− lead 98. In this two stage ESD network configuration the first transistor 150g acts as a low BVCEO device and the second transistor 150h acts as a high BVCEO device. In this network, the first trigger transistor 150g discharges current when the MR+ exceeds the BVCEO of the first transistor. This serves as base current to drive the base of the second transistor 150h. The advantage of this circuit is that the first transistor serves as a low voltage trigger element and the second transistor stage serves as a voltage clamp to minimize the voltage observed at the GMR head.

FIG. 24 depicts an ESD protection device in which two SiGe or SiGeC transistors 150i and 150j are configured to act as a two stage ESD network. That is, the emitter of a first transistor 150i is engaged to the MR+ lead 96, the base of the first transistor 150i can be floating, connected to its emitter or to additional circuitry, and the collector of the first transistor 150i is connected to both the base of a second transistor 150j and through a resistive element 212 to the MR− lead 98. The emitter of the second transistor 150j is connected to the MR+ lead 96, and the collector of the second transistor 150j is connected through a resistive element 216 to the MR− lead 98. In this two stage ESD network configuration the first transistor 150i acts as a low BVCEO device and the second transistor 150j acts as a high BVCEO device. In this network, the first trigger transistor 150i discharges current when the MR+ exceeds the BVECO of the first transistor. This serves as base current to drive the base of the second transistor 150j. The advantage of this circuit is that the first transistor serves as a low voltage trigger element and the second transistor stage serves as a voltage clamp to minimize the voltage observed at the GMR head. In this implementation the reverse transistor is used instead of the forward transistor. The advantage is the low capacitance of the emitter-base junction.

FIG. 25 illustrates a second generalized embodiment 250 of the invention wherein the GMR head 54 is constructed on the trailing edge 112 of the slider 66 and the silicon chip 108 with the ESD protection device is mounted upon the GMR head. In this arrangement the GMR head 54 is located between the slider 66 and the silicon chip 108. FIG. 26 illustrates an exemplary connection of the GMR sensor 54 to the ESD protection device 120. In this embodiment the GMR sensor 54 is connected by vias 254 to a pair of pads 258 at an outer surface of the head for connection to corresponding pads 262 at an outer surface of the silicon chip 108. The pads 258 and 262 connect with one another when the silicon chip 108 is mounted over the GMR head 54 on the slider 66. Accordingly, the GMR sensor 54 is connected to the ESD protective device 120 via the head vias 254 and the pads 258 and 262.

Figure 27:
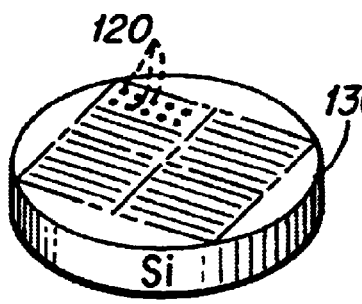
FIGS. 27–32 are schematic illustrations of the method of constructing the second embodiment of the invention shown in FIGS. 25 and 26.
Figure 28:
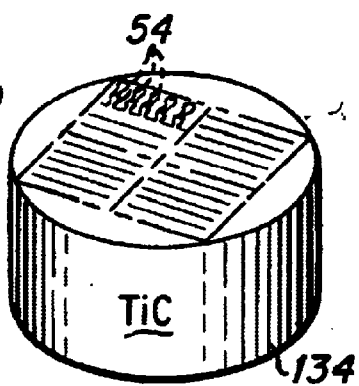
Figure 29:
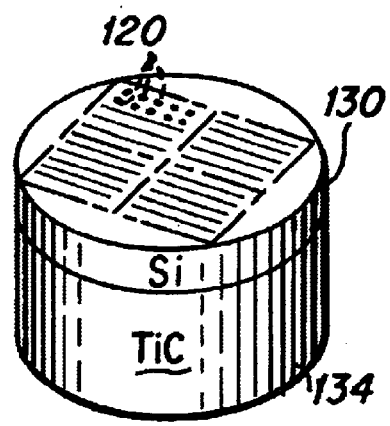
Figure 30:
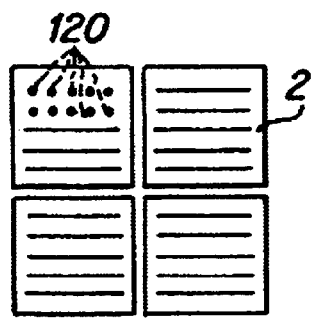
Figure 31:
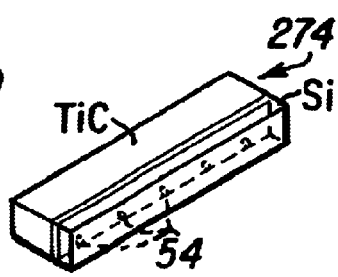
Figure 32:
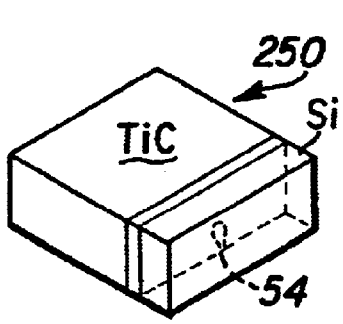

FIGS. 27 through 32 illustrate the various steps in constructing the second embodiment 250 illustrated in FIGS. 25 and 26. FIG. 27 illustrates the step of constructing the ESD protective SiGe circuit devices 120 on the silicon wafer 130. FIG. 28 illustrates the step of constructing the GMR heads 54 on the TiC wafer 134. FIG. 29 illustrates the step of fixedly mounting the silicon wafer 130 to the TiC wafer 134. FIG. 30 illustrates dicing the composite wafer of FIG. 29 into quadrants 270 which contain rows and columns of the desired sliders. FIG. 31 illustrates a row 274 of desired sliders after a step of dicing one of the quadrants 270 of FIG. 30 into a plurality of rows of sliders. FIG. 32 illustrates a composite slider 66, MR head 54, and silicon chip 108 after dicing the row 274 of sliders into a plurality of individual sliders that constitute a magnetic head 250 of the present invention. One advantage of this method over the method illustrated in FIGS. 5A-9 is that the heat in constructing the GMR heads 54 on the wafer 134 will not damage the bonding of the wafer 130 to 134 as illustrated in FIG. 29.

Obviously, other embodiments and modifications of the invention will occur to those of ordinary skill in the art in view of the above teachings. Therefore, the invention is to be limited only by the following claims, which include all of such embodiments and modifications when viewed in conjunction with the above specification and accompanying drawings.

What is claimed is:

1. A magnetic head including a combined read head and slider comprising:
    a non-silicon slider body having a trailing edge;
    a silicon chip having a leading edge and a trailing edge;
    at least one silicon germanium circuit device being disposed in the silicon chip, wherein the silicon germanium circuit device includes at least one silicon germanium transistor or at least one silicon germanium carbon transistor;
    the read head being disposed on a selected one of the trailing edge of the slider between the slider and the silicon chip or the trailing edge of the silicon chip and being connected to the silicon circuit device.

2. A magnetic head as described in claim 1 wherein said read head includes a GMR sensor having MR+ and MR− electrical leads, and said silicon germanium circuit device is mounted across said MR+ and MR− electrical leads.

3. A magnetic head as described in claim 2 wherein said silicon germanium circuit device includes at least one silicon germanium heterojunction bipolar transistor (SiGe HBT), or at least one silicon germanium carbon heterojunction bipolar transistor (SiGeC HBT).

4. A magnetic head as described in claim 3 wherein said silicon germanium circuit device is mounted in a diodic configuration.

5. A magnetic head as described in claim 3 wherein said silicon germanium circuit device is mounted in an npn mode.

6. A magnetic head as described in claim 3 wherein at least two said silicon germanium circuit devices are mounted in a series cascade configuration.

7. A magnetic head as described in claim 3 wherein at least two said silicon germanium circuit devices are mounted in a two stage ESD network configuration.

8. A magnetic head, comprising:
    a slider body portion;
    a silicon chip portion having a silicon germanium ESD protection circuit device fabricated therewithin;
    a read/write head portion including a GMR head including two electrical leads connected therewith;
    said silicon germanium ESD protection circuit device being electrically engaged across two said electrical leads of said GMR head.

9. A magnetic head as described in claim 8 wherein said silicon germanium circuit device includes at least one silicon germanium heterojunction bipolar transistor (SiGe HBT), or at least one silicon germanium carbon heterojunction bipolar transistor (SiGeC HBT).

10. A magnetic head as described in claim 9 wherein said silicon germanium circuit device is mounted in a diodic configuration.

11. A magnetic head as described in claim 9 wherein said silicon germanium circuit device is mounted in an npn mode.

12. A magnetic head as described in claim 9 wherein at least two said silicon germanium circuit devices are mounted in a series cascade configuration.

13. A magnetic head as described in claim 9 wherein at least two said silicon germanium circuit devices are mounted in a two stage ESD network configuration.

14. A magnetic head as described in claim 9 wherein said read/write head is fabricated upon said slider body and said silicon chip is engaged to said read/write head, such that said read/write head is sandwiched between said slider body and said silicon chip.

15. A magnetic head as described in claim 9 wherein said silicon chip is fabricated upon said slider body and said read/write head is fabricated upon said silicon chip, such that said silicon chip is sandwiched between said slider body and said read/write head.

16. A hard disk drive including a magnetic head, comprising:
    a slider body portion;
    a silicon chip portion having a silicon germanium ESD protection circuit device fabricated therewithin;
    a read/write head portion including a GMR head including two electrical leads connected therewith;
    said silicon germanium ESD protection circuit device being electrically engaged across two said electrical leads of said GMR head.

17. A hard disk drive as described in claim 16 wherein said silicon germanium circuit device includes at least one silicon germanium heterojunction bipolar transistor (SiGe HBT) or at least one silicon germanium carbon heterojunction bipolar transistor (SiGeC HBT).

18. A hard disk drive as described in claim 17 wherein said silicon germanium circuit device mounted in a diodic configuration.

19. A hard disk drive as described in claim 17 wherein said silicon germanium circuit device is mounted in an npn mode.

20. A hard disk drive as described in claim 17 wherein at least two said silicon germanium circuit devices are mounted in a series cascade configuration.

21. A hard disk drive as described in claim 17 wherein at least two said silicon germanium circuit devices are mounted in a two stage ESD network configuration.

22. A hard disk drive as described in claim 17 wherein said read/write head is fabricated upon said slider body and said silicon chip is engaged to said read/write head, such that said read/write head is sandwiched between said slider body and said silicon chip.

23. A hard disk drive as described in claim 17 wherein said silicon chip is fabricated upon said slider body and said read/write head is fabricated upon said silicon chip, such that said silicon chip is sandwiched between said slider body and said read/write head.

24. A method for fabricating a magnetic head having an ESD protection device, comprising:

fabricating a plurality of SiGe integrated circuit devices within a silicon wafer, each said SiGe device including electrical leads disposed for connection with electrical leads of a GMR read head;

fabricating a plurality of read/write heads upon said silicon wafer, wherein each said read/write head includes a GMR read head, and wherein each GMR read head includes electrical leads that are fabricated for electrical connection with said electrical leads of said SiGe circuit device;

bonding said silicon wafer to a slider substrate wafer to form a combined wafer, such that said SiGe circuit device is electrically connected across said electrical leads of said GMR read head; and cutting said combined wafer into a plurality of rows and cutting each said row to yield a plurality of individual magnetic heads, wherein each said magnetic head includes a slider substrate portion, a silicon chip portion having a SiGe circuit device therewithin and a GMR read head, wherein said SiGe circuit device is electrically connected across said electrical leads of said GMR read head.

25. A method for fabricating a magnetic as described in claim 24 wherein said SiGe circuit device includes at least one silicon germanium heterojunction bipolar transistor (SiGe HBT) or at least one silicon germanium carbon heterojunction bipolar transistor (SiGeC HBT).

26. A method for fabricating a magnetic head as described in claim 25 wherein said SiGe circuit device is mounted in a diodic configuration.

27. A method for fabricating a magnetic head as described in claim 25 wherein said SiGe circuit device is mounted in an npn mode.

28. A method for fabricating a magnetic head as described in claim 25 wherein at least two said SiGe circuit devices are mounted in a series cascade configuration.

29. A method for fabricating a magnetic head as described in claim 25 wherein at least two said SiGe circuit devices are mounted in a two stage ESD network configuration.

30. A method for fabricating a magnetic head having an ESD protection device, comprising:

fabricating a plurality of SiGe integrated circuit devices within a silicon wafer, each said SiGe circuit device including electrical leads disposed for connection with electrical leads of a GMR read head;

fabricating a plurality of read/write heads upon said silicon wafer, wherein each said read/write head includes a GMR read head, and wherein each GMR read head includes electrical leads that are fabricated for electrical connection with said electrical leads of said SiGe circuit device, such that said SiGe circuit device is electrically connected across said electrical leads of said GMR read head;

bonding said silicon wafer to a slider substrate wafer to form a combined wafer; and cutting said combined wafer into a plurality of rows and cutting each said row to yield a plurality of individual magnetic heads, wherein each said head includes a slider substrate portion, a silicon chip portion having an SiGe circuit device therewithin and a read/write head including a GMR read head, wherein said SiGe circuit device is electrically connected across said electrical leads of said GMR read head.

31. A method for fabricating a magnetic head as described in claim 30 wherein said SiGe circuit device includes at least one silicon germanium heterojunction bipolar transistor (SiGe HBT) or at least one silicon geranium carbon heterojunction bipolar transistor (SiGeC HBT).

32. A method for fabricating a magnetic head as described in claim 31 wherein said SiGe circuit device is mounted in a diodic configuration.

33. A method for fabricating a magnetic head as described in claim 31 wherein said SiGe circuit device is mounted in an npn mode.

34. A method for fabricating a magnetic head as described in claim 31 wherein at least two said SiGe circuit devices are mounted in a series cascade configuration.

35. A method for fabricating a magnetic head as described in claim 31 wherein at least two SiGe circuit devices are mounted in a two stage ESD network configuration.

* * * * *